United States Patent
Grego et al.

(10) Patent No.: US 7,046,990 B2
(45) Date of Patent: May 16, 2006

(54) METHOD FOR DETECTING ACCESS TO CONTROLLED AREAS AND RELATED SYSTEM

(75) Inventors: Giorgio Grego, Turin (IT); Michele Lupano, Turin (IT)

(73) Assignee: Telecom Italia Lab S.p.A., Turin (IT)

( * ) Notice: Subject to any disclaimer, the term of this patent is extended or adjusted under 35 U.S.C. 154(b) by 279 days.

(21) Appl. No.: 10/149,919

(22) PCT Filed: Dec. 19, 2000

(86) PCT No.: PCT/EP00/12961

§ 371 (c)(1),
(2), (4) Date: Jun. 10, 2002

(87) PCT Pub. No.: WO01/49055

PCT Pub. Date: Jul. 5, 2001

(65) Prior Publication Data

US 2003/0083043 A1    May 1, 2003

(30) Foreign Application Priority Data

Dec. 27, 1999   (IT)   ............................. TO99A1158

(51) Int. Cl.
*H04M 1/66*   (2006.01)
(52) U.S. Cl. .................. 455/410; 455/411; 455/456.1; 455/456.3; 455/419; 455/414.1
(58) Field of Classification Search ........ 455/410–411, 455/419–420, 414.1, 414.3
See application file for complete search history.

(56) References Cited

U.S. PATENT DOCUMENTS

| | | | | |
|---|---|---|---|---|
| 4,626,836 A | * | 12/1986 | Curtis et al. | 345/156 |
| 5,274,368 A | * | 12/1993 | Breeden et al. | 340/7.2 |
| 5,440,758 A | * | 8/1995 | Grube et al. | 455/9 |
| 5,465,082 A | * | 11/1995 | Chaco | 340/825.49 |
| 5,574,786 A | * | 11/1996 | Dayan et al. | 713/202 |
| 5,689,229 A | * | 11/1997 | Chaco et al. | 340/286.07 |
| 5,712,973 A | * | 1/1998 | Dayan et al. | 713/200 |
| 5,950,130 A | * | 9/1999 | Coursey | 455/432.1 |
| 5,970,227 A | * | 10/1999 | Dayan et al. | 713/200 |
| 6,009,333 A | * | 12/1999 | Chaco | 455/456.5 |

(Continued)

FOREIGN PATENT DOCUMENTS

EP   0 641 137   3/1995

(Continued)

*Primary Examiner*—William Trost
*Assistant Examiner*—Sharad Rampuria
(74) *Attorney, Agent, or Firm*—Herbert Dubno

(57) ABSTRACT

A controlled area (A) is configured as a telecommunications cellular system location area, connection of cellular system mobile terminals (T) to such location area (A) is checked. A detected connection indicates that the bearer of the terminal (T) accessed the controlled area, which information can thus be used both to prevent unauthorized access and to certify and document authorized access also by interrogation through the system. The fact that terminal (T) has been kept switched on inside the controlled area despite this being interdicted can also be detected and such behavior can be debited to the terminal (T) involved and/or the terminal can be inhibited by means of temporary deactivation of the terminal (T).

14 Claims, 2 Drawing Sheets

U.S. PATENT DOCUMENTS

| | | | |
|---|---|---|---|
| 6,061,558 A * | 5/2000 | Kennedy et al. | 455/411 |
| 6,144,848 A * | 11/2000 | Walsh et al. | 455/419 |
| 6,212,390 B1 * | 4/2001 | Rune | 455/456.6 |
| 6,286,102 B1 * | 9/2001 | Cromer et al. | 713/200 |
| 6,298,240 B1 * | 10/2001 | Chavez, Jr. | 455/519 |
| 6,490,455 B1 * | 12/2002 | Park et al. | 455/456.4 |
| 6,516,190 B1 * | 2/2003 | Linkola | 455/408 |
| 6,539,393 B1 * | 3/2003 | Kabala | 707/102 |
| 6,556,820 B1 * | 4/2003 | Le et al. | 455/411 |
| 6,766,161 B1 * | 7/2004 | Geiselman et al. | 455/411 |
| 2001/0053684 A1 * | 12/2001 | Pirila | 455/411 |
| 2003/0054809 A1 * | 3/2003 | Bridges et al. | 455/419 |

FOREIGN PATENT DOCUMENTS

| | | |
|---|---|---|
| EP | 641137 A2 * | 3/1995 |
| EP | 0 891 110 | 1/1999 |
| GB | 2 329 794 | 3/1999 |

* cited by examiner

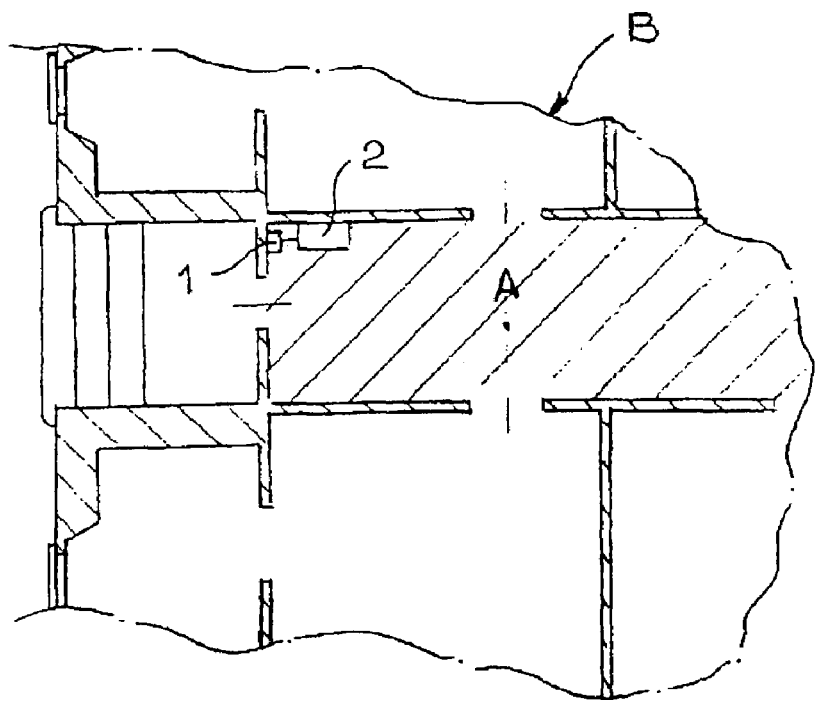
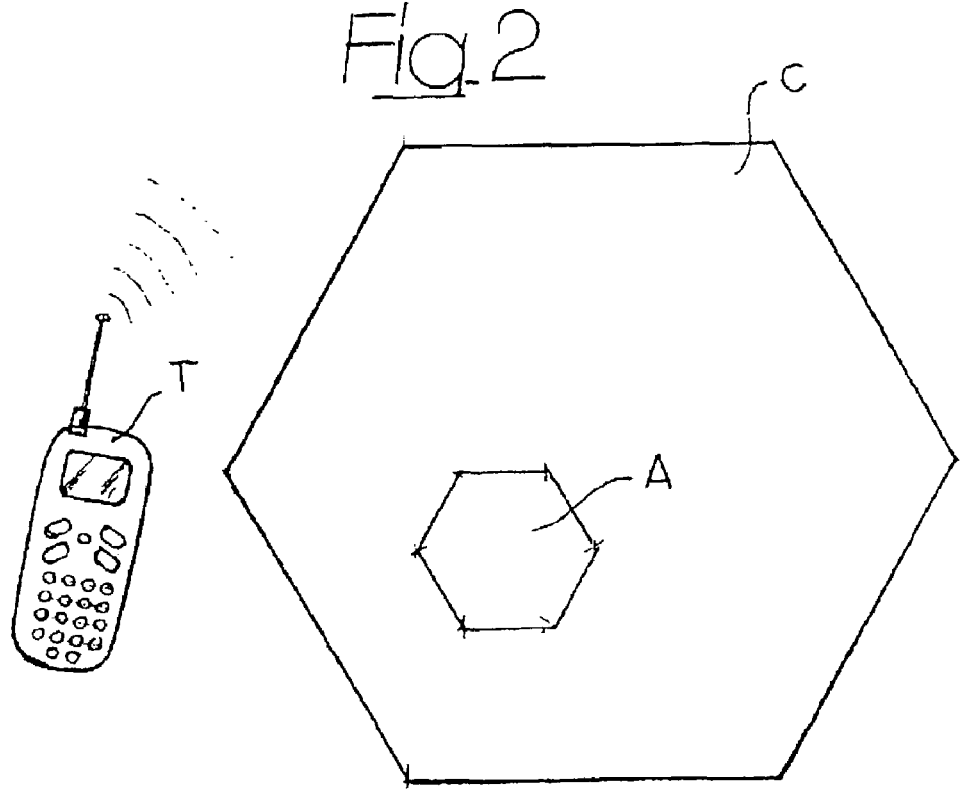

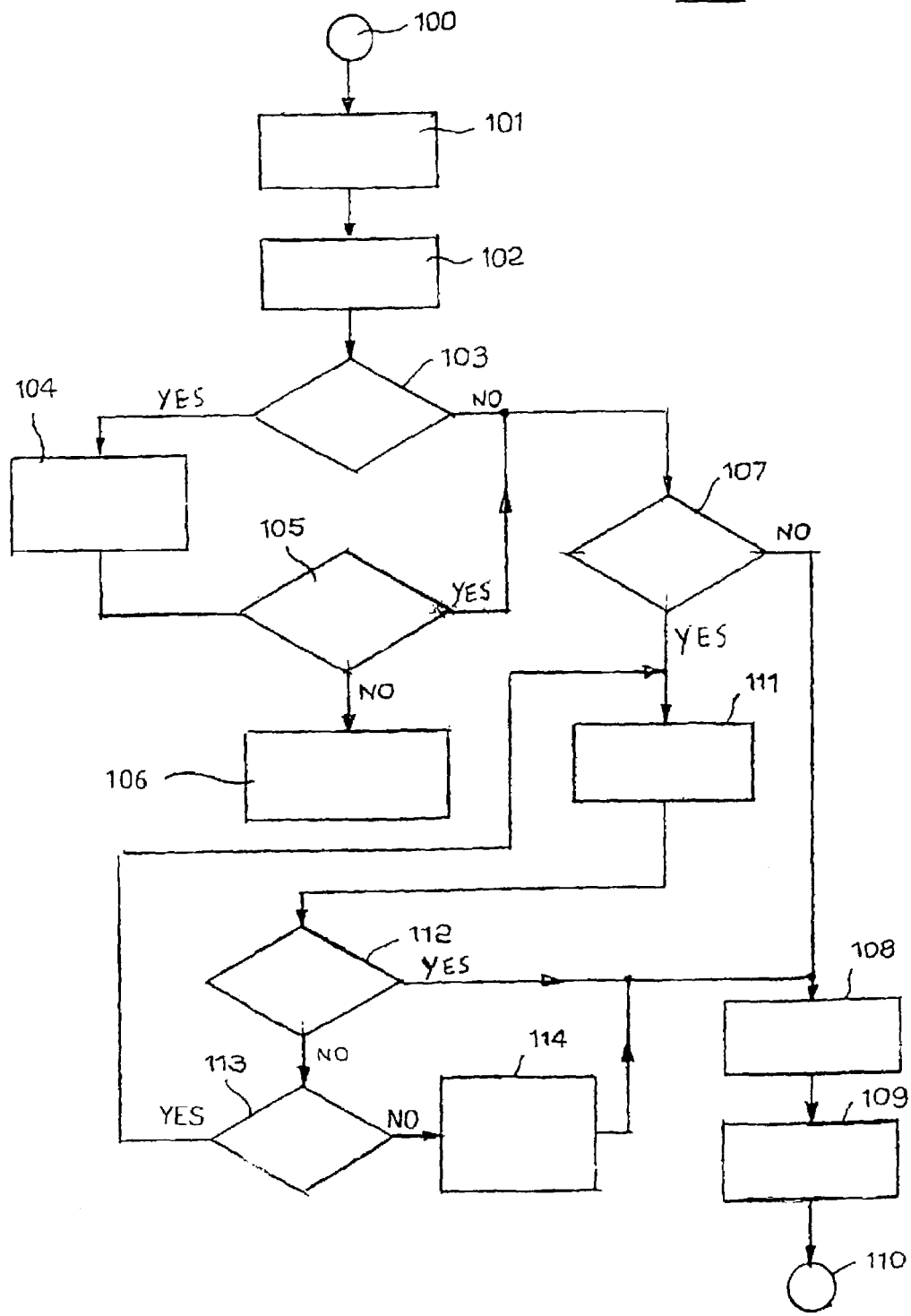

METHOD FOR DETECTING ACCESS TO CONTROLLED AREAS AND RELATED SYSTEM

CROSS REFERENCE TO RELATED APPLICATIONS

This application is a national stage of PCT/EP00/12961 filed 19 Dec. 2001 and based upon Italian national application to 99A001158 of 28 Dec. 1999 under the International Convention.

TECHNICAL FIELD

This invention relates to detecting access to controlled areas.

BACKGROUND ART

The issue of controlling access has already been addressed extensively as regards technique, especially with reference to the need to prevent unauthorized persons from gaining entry to given workplaces, research centers, public offices and the like.

Solutions thereto are quite varied. One of the most widely applied solution consists in using cards or badges to be inserted into detection devices for selectively controlling the opening of barriers preventing access to controlled areas. Such cards or badges can also be configured as contactless smart cards able to dialogue with the detection devices to which they are shown. These solutions do not generally provide automatic detection as this is performed by the effect of a positive action of the card or badge holder.

In the field of telecommunication systems has been proposed by European Publication EP-A-0641137 a method for restricting the use of mobile terminals to predetermined areas of a telecommunication system. The known method requires storing in the mobile terminals a list of the predetermined areas wherein it is possible to use said mobile terminals.

Moreover, in the same field, European Publication EP-A-0891110 discloses a method for preventing the use of mobile terminals inside predetermined areas of a telecommunication system. Such a method is directed to impede the use of any mobile terminal inside the predetermined areas, without controlling and/or authorizing the access of determined mobile terminals inside the predetermined areas.

DISCLOSURE OF THE INVENTION

This invention relates to the access detection in a wider perspective, for instance by taking into account the need to supply documentation to prove that a certain person equipped with a mobile terminal entered a given controlled area at a given time. The availability of a function of this type can be of interest to technical service and maintenance Companies to document activities tendered to a given Customer inclusive of periodical accountancy and administrative reports.

The method according to the invention, pursues the objectives as illustrated above by exploiting the widespread application of cellular telecommunications systems, and also offers the further advantage of being able to extend monitoring action to detect the fact that a mobile terminal is kept switched on in an area where the use of such terminal is prohibited. All the foregoing is attained with the further possibility of sending the user messages inviting such user to switch off the terminal and imposing sanctions and/or inhibiting use of the mobile terminal inside the prohibited area.

The method for detecting access of a mobile terminal (T) having an identification code to a controlled area (A), comprise the steps of:

configuring the controlled area (A) as a location area of a cellular telecommunications system;

detecting the connection of the mobile terminals (T) to the location area (A) by identifying the identification code of the mobile terminal, and comparing by means of said cellular telecommunications system the identification code with a list of identification codes authorised to access the controlled area (A). The list of authorized identification codes can be locally accessible at the level of the location area (A).

The method can include issuing to each mobile terminal of said cellular telecommunications system accessing to said location area a request to issue its identification code, and recording the identification code received in consequence of said request.

At least one piece of auxiliary information identifying the connection, together with said identification code can be recorded. The at least one piece of auxiliary information can comprise the time of connection. The identification code can be recorded at the level of the cellular system manager.

The method can also include the step of setting up a box for collecting recorded identification codes at the cellular system manager level, the box being able to be selectively questioned throughout the cellular telecommunications system.

According to another feature, the method comprises the steps of:

identifying the location area (A) as an area within which the use of mobile terminals (T) of said cellular system is prohibited, and issuing, in the presence of a detected connection, a message inviting the user to switch off the terminal.

The method can also include:

detecting that the terminal (T) has been kept switched on despite a message inviting the switching off of the terminal has been sent, and imposing sanctions to that said terminal. Sanctions can be imposed to that said terminal which was kept switched on, by debiting a fine to said terminal. Sanctions can be imposed to said terminal which was kept switched on by inhibiting at least momentarily the faculty of said terminal to receive calls from the cellular telecommunications system and/or to forward calls to said cellular telecommunications system.

The invention also covers the related system.

BRIEF DESCRIPTION OF DRAWING

The invention will now be described by way of an example with reference to the accompanying drawing, where:

FIGS. 1 and 2 schematically illustrate the general criteria for implementing a process according to the invention; and FIG. 3 is a flow diagram illustrating the modalities for implementing the method according to the invention.

BEST MODE FOR CARRYING OUT THE INVENTION

FIG. 1 shows a schematic representation of a building B containing one or more environments, such as the environment indicated with A, allocated to be configured as an area of controlled access.

Area A may for instance correspond to the access corridor to building B or the access corridor to one of the building B levels, to which access is to be given to only a certain number of authorized persons.

Alternatively, though not being a restricted access area per se, area A can anyhow be a controlled access area in the sense that documentation of access to the area is required; this is to the benefit both to the building user/owner and to those accessing the building itself, for instance those supplying assistance and maintenance services, as well as these supervising the building security requirements and the like.

Area A can also be an area inside which the use of telecommunications system mobile terminals must be prohibited, such as the auditorium of a theater or a concert hall for instance, where prevention of disturbances caused by possible buzzer activation is desired.

Area A may similarly be an area of an airport building, such as a jet-way that passengers travel through to reach an aircraft for instance, where it is necessary to check that passengers accessing the aircraft with any mobile telephone terminals they may be carrying securely have switched off.

Even though Area A of FIG. 1 is identified as one room of building B, the area itself may obviously cover several building areas or extend to just a part of such rooms.

The solution provided by the invention is based on configuring area A as a so-called location area of a cellular type communications system. The location area concept is well-known to the cellular communications business and in particular in the GSM system where this term identifies a part of territory served by the system and to which a univocal identification is associated. Reference is made for instance to O. Bertazzoli, L. Favalli: "GESM— The European Mobile Communications System: Techniques, architecture and procedures", Hoepli, Milan 1996. Area A may be a so-called micro or picocell for the purpose of this invention.

The possibility of implementing very small location areas (the so-called micro or picocells) in systems of this type is based on the use of well-known technological solutions.

A transceiver 1 of FIG. 1 is a transceiver whose field of action essentially covers the room defining area A. Transceiver 1 is connected to a cellular type mobile communications system by means of a local terminal 2.

As specified above, area A can for instance be a so-called picocell inside cell C of a cellular system to which any number of mobile terminals T are connected according to criteria well-known as regards technique. Since area A is a location area, it will be associated to a location area identification (LAI) other than that of cell C (FIG. 2) and the adjacent areas.

Each of such terminals is identified inside its related telecommunications system by corresponding user identification.

Besides ensuring connection of transceiver 1 to the system network and thereby originating a so-called base station (BS) serving cell C, terminal 2 can be advantageously used to store a local list, with the possibility of rapidly updating, of identification codes corresponding to a given number of users, each provided with a terminal T and authorised to access area A.

As specified above, picocell A is configured as a so-called system location area so as to automatically originate a request for identification transmission to any terminal T accessing area A.

All the above takes place according to the sequence of operations or steps as represented by the flow diagram shown at FIG. 3.

It can be ideally believed that the above sequence is activated automatically by the system whenever access by a new terminal T inside area A is detected.

Starting from an initial step 100, at step 101, the system automatically requests mobile terminal T that has just entered area A to transmit its identification.

This identification is received by the system at a subsequent step 102.

In the subsequent selection step indicated by reference 103 it is checked whether area A is identified as a restricted access area, that is to say the area that only a given number of users are allowed access to. Such users are identified precisely as the identification codes of their mobile terminals T are resident in the local terminal 2 memory.

The solution of locally, i.e. at terminal 2, storing the list of approved identification codes is preferential, especially to facilitate any updating operation, but not mandatory. Also the telecommunications system manager could in actual fact store this list, with the consequent possibility of implementing checks by exchanging messages on the system network. The procedure for such remote control operation is to be considered as known per se and as such does not require detailed description here.

A simple programming operation on local terminal 2 that can be performed with well-known criteria can also selectively modify the characteristics of area A, by making it become a restricted access area in special conditions only, for instance, during given hours of the day.

A museum area open to the public during visiting hours can be processed to become a restricted access area open only to museum personnel during hours when the museum is closed to the public for instance.

If, in step 103, area A is recognized as the restricted access area, during a subsequent step 104, the identification code received from the terminal entering area A is compared with the list of authorized identification codes stored at local terminal 2.

At subsequent step 105, the system checks whether or not the identification of terminal T under review is listed among those authorized to access.

In the event of a negative crosscheck, the system proceeds to step 106, identifiable as an alarm procedure.

The criteria for implementing this alarm procedure can vary quite a lot subject to specific application requirements.

Area A consisting of a system location area can be set to include a part that has access separate from the rest of area A by means of a physical barrier such as a door or gate. The alarm procedure can be provided with a block for opening such a barrier, whereby the bearer of an identification of an unauthorized terminal T identified as such by the system is unable to proceed further into area A.

Other possible alarm procedure implementations can for instance include the emission of acoustic or visual type warning signals or other signals through the cellular system to a surveillance station to indicate that an unauthorised person is attempting to access area A.

If, however, the identification code received corresponds to one of those authorised to access area A, the program proceeds to subsequent selection step 107. In this step, which is also accessed directly from step 103 when area A is not configured as a restricted access area, it is checked whether possibly area A is an area in which the use of mobile terminals is intended to be prohibited.

Thus, like step 103, selection step 107 corresponds to a possible system programming operation of local terminal T. I.e. area A can be alternatively configured as an area where the use of mobile terminals is allowed or prohibited subject to specific requirements. In the case of a theater for instance, the use of mobile terminals can be prohibited when shows or other events are being performed in the theater itself and authorized when such use does not contrast with the use the theater is put to at that moment.

If area A is not configured as an area where the use of mobile terminals is prohibited, the system proceeds directly to step 108 where the terminal having accessed area A is recorded, with the preferable entry of data such as the date and time of access, together with any other information as may be considered useful. All this in view of the possible transmission of such information (Step 109) to the system manager as well as to local terminal 2. Emitting a so-called brief message or SMS for instance can easily complete this operation.

The information transmitted as above can for instance be collected and recorded at the level of the system manager in a file accessible through the system itself by one or more terminals authorised to access area A.

This mode of use can be advantageous when one or more of the terminals under review are for instance carried by a person having to periodically access area A for maintenance and service operations.

By accessing the system cell described previously, such person may thus for instance periodically obtain an access authorization ticket either for entry to or for exit from area A, used to prepare administrative and accountancy documents for instance.

Step 109 is followed by procedure end step 110.

Since recording of entries to and exits from area A has already been mentioned, it will be readily appreciated that the operational mode described with reference to steps 100–103 and 107–109 is applicable also the other way round, i.e. to the recording of a terminal exiting area A (since it is an exit, steps 103 and 107 obviously have a univocal outcome).

Should area A be at least momentarily configured as an area in which the use of mobile terminals is prohibited (positive outcome of selection step 107) the system proceeds to subsequent step 111 which corresponds to the system emitting to terminal T a message inviting the terminal to be switched off. This message can for instance be in the form of a special buzzer message.

After a preset period of time such as a few seconds, the system checks whether the terminal has been switched off or not at step 112.

If the system has been switched off, the system proceeds to step 108 described previously.

If the terminal appears to have been left on, the system first proceeds to step 113 investigating whether the programme is (still) aimed at repeating the invitation to switch off the terminal which invitation had not been accepted at its first emission. The repeated emission is carried out for a certain number of repetitions for instance, possibly adjustable by the system subject to application requirements.

If the system ascertains that the invitation to switch off terminal T has not been accepted despite the fact it has been repeated for as many times as programmed, it proceeds to step 114, which imposes sanctions against the use of the terminal T.

Step 114 can for instance be programmed to automatically debit a fine to terminal T and then proceed to steps 108 and 109 thereby certifying that the fine was actually levied as a consequence of the user having kept a terminal open at a given time of a given day during access to area A where the use of mobile terminals was prohibited.

Step 114 can also in a known way take on a feature of inhibiting terminal T operation. In this case, the system considers the terminal under review as a momentarily deactivated/unreachable terminal and does not send calls originating from terminal T or directed at it for a given period of time, for example several hours.

The principle of the invention remaining unchanged, implementation details can change considerably from the description and illustration given above without thereby leaving the scope of this invention. In particular, even though the system and claims use typical GSM system terminology, the invention can obviously apply to any mobile communications system.

The invention claimed is:

1. A method of detecting and limiting access of a person to a controlled area, comprising the steps of:
   assigning to said person a mobile terminal having an identification code associated with said person and providing said person with said mobile terminal;
   configuring said controlled area as a location area of a cellular telecommunications system;
   and characterised by the steps of:
   detecting connections of said mobile terminals of other individuals to said location area by identifying the identification code of each mobile terminal; and
   comparing with said cellular telecommunications system the identification code associated with said person with a list of identification codes authorized to access the controlled area; and
   conditioned to a first result of said comparing, activating an alarm procedure so as to prevent access of said person to said controlled area.

2. The method according to claim 1 wherein said list of authorised identification codes is locally accessible at a level of the location area.

3. The method according to claim 1 which includes the steps of:
   issuing to each mobile terminal of said cellular telecommunications system accessing to said location area a request to issue its identification code, and
   recording the identification code received in consequence of said request.

4. The method according to claim 3 which includes the step of recording at least one piece of auxiliary information identifying the connection, together with said identification code.

5. The method according to claim 4 wherein the at least one piece of auxiliary information can comprises the time of connection.

6. The method according to claim 3 wherein said identification code is recorded at the level of the cellular system manager.

7. The method according to claim 6 which includes the step of setting up a box for collecting recorded identification codes at the cellular system manager level, the box being able to be selectively questioned throughout the cellular telecommunications system.

8. The method according to claim 1 which includes the step of:
   identifying said location area as an area within which the use of mobile terminals of said cellular system is prohibited, and
   issuing, in the presence of a detected connection, a message inviting the person to switch off the terminal.

9. The method according to claim 8 which includes the steps of:
   detecting that the terminal has been kept switched on despite a message inviting the switching off of the terminal has been sent, and
   imposing sanctions to that said terminal.

10. The method according to claim 9 wherein sanctions are imposed to that said terminal which was kept switched on, by debiting a fine to said terminal.

11. The method according to claim 9 wherein sanctions are imposed to said terminal which was kept switched on by inhibiting at least momentarily the faculty of said terminal to receive calls from the cellular telecommunications system and/or to forward calls to said cellular telecommunications system.

12. The method defined in claim 1 wherein, conditioned to a second result of said comparing, said person is allowed access to said controlled area.

13. The method defined in claim 12 wherein said alarm procedure includes blocking of an opening in a barrier.

14. The method defined in claim 13 wherein the blocking of an opening in a barrier includes closing a door or gate.

* * * * *